United States Patent
Tompkin et al.

(10) Patent No.: US 8,020,776 B2
(45) Date of Patent: Sep. 20, 2011

(54) MULTILAYER ELEMENT WITH AN IDENTIFICATION WHICH CAN BE READ OPTICALLY BY A MACHINE

(75) Inventors: Wayne Robert Tompkin, Baden (CH); John Anthony Peters, Au (CH)

(73) Assignee: OVD Kinegram AG, Zug (CH)

( * ) Notice: Subject to any disclaimer, the term of this patent is extended or adjusted under 35 U.S.C. 154(b) by 489 days.

(21) Appl. No.: 12/223,596

(22) PCT Filed: Feb. 9, 2007

(86) PCT No.: PCT/EP2007/001098
§ 371 (c)(1),
(2), (4) Date: Sep. 25, 2008

(87) PCT Pub. No.: WO2007/090656
PCT Pub. Date: Aug. 16, 2007

(65) Prior Publication Data
US 2009/0034389 A1    Feb. 5, 2009

(30) Foreign Application Priority Data
Feb. 11, 2006  (DE) .................. 10 2006 006 323

(51) Int. Cl.
*G06K 19/06* (2006.01)
(52) U.S. Cl. .............. 235/494; 235/454; 235/462.04
(58) Field of Classification Search .......... 235/435, 235/439, 462.01, 462.32, 487, 494, 454, 235/462.04
See application file for complete search history.

(56) References Cited

U.S. PATENT DOCUMENTS

| | | |
|---|---|---|
| 4,143,810 A | 3/1979 | Greennway |
| 5,032,003 A | 7/1991 | Antes |
| 5,059,776 A | 10/1991 | Antes |
| 5,591,952 A | 1/1997 | Kricheaer et al. |
| 6,359,734 B1 | 3/2002 | Staub et al. |
| 6,819,409 B1 | 11/2004 | Tompkin et al. |
| 6,892,949 B2 * | 5/2005 | Mondie .................. 235/491 |
| 6,927,885 B2 | 8/2005 | Staub et al. |

FOREIGN PATENT DOCUMENTS

| | | |
|---|---|---|
| CH | 594 935 | 1/1978 |
| DE | 199 24 750 | 10/2000 |
| EP | 0 366 858 | 5/1990 |
| EP | 0 375 833 | 7/1990 |
| EP | 0 718 795 | 6/1996 |
| EP | 0 883 085 | 12/1998 |
| WO | WO 00/62237 | 10/2000 |
| WO | WO 03/027952 | 4/2003 |

* cited by examiner

*Primary Examiner* — Steven S Paik
*Assistant Examiner* — Christle Marshall
(74) *Attorney, Agent, or Firm* — Hoffmann & Baron, LLP

(57) ABSTRACT

A multi-layer body (10*i*) includes an optically machine-readable identification, wherein the multi-layer body has at least one first plastic material layer with a microscopically fine relief structure shaped in that layer and the optical effect of the microscopically fine relief structure can be altered regionwise for writing in an item of information. First and second regions have different relief structures and form a background pattern (1 through 7) which encodes a first item of information and which is partially altered for writing in an individualized code pattern (1*i* through 3*i*) which encodes an individualized second item of information and which overlaps the background pattern. There is also described a method of manufacturing such a multi-layer body and a method of reading the items of information.

34 Claims, 6 Drawing Sheets

State of the art

State of the art

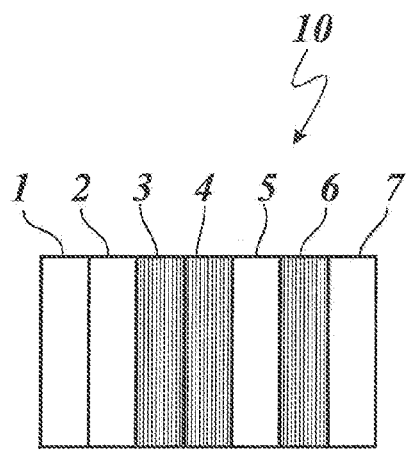
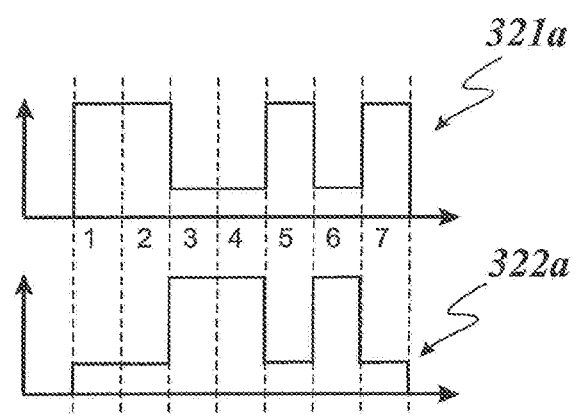
*Fig. 3a*  *Fig. 3b*
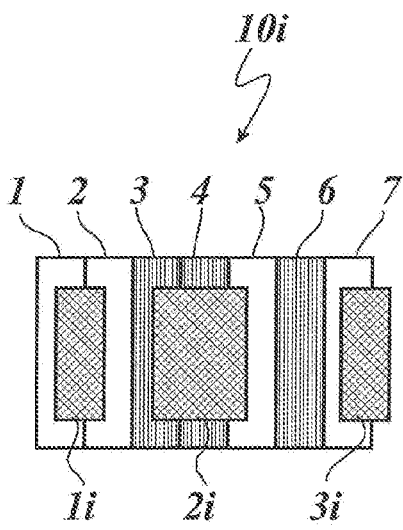
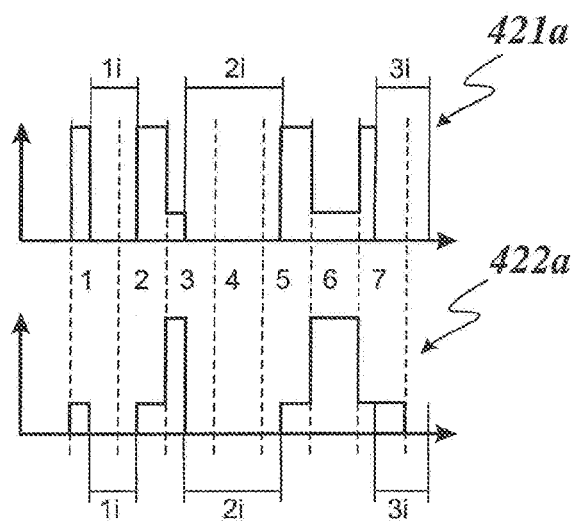
*Fig. 4a*  *Fig. 4b*

MULTILAYER ELEMENT WITH AN IDENTIFICATION WHICH CAN BE READ OPTICALLY BY A MACHINE

This application claims priority based on an International Application filed under the Patent Cooperation Treaty, PCT/EP2007/001098, filed on Feb. 9, 2007 and German Application No. DE 1020060063236, filed on Feb. 11, 2006.

BACKGROUND OF THE INVENTION

The invention concerns a multi-layer body having an optically machine-readable identification, a method of manufacturing such a multi-layer body and a method of reading an item of information out of such a multi-layer body.

EP 0 718 795 A1 discloses an information strip with optically encoded information. Optical markings are arranged on the information strip in bit lines, wherein at least two bit lines with identical division into surface portions of equal size are required. Each surface portion is occupied for example by an optical diffraction element. The diffraction elements of the one bit line involve the same grating parameters (spatial frequency, profile shape, azimuth and so forth) and differ from the diffraction elements of the adjacent other bit line. A respective surface portion from the one bit line forms with the adjacent surface portion from the other bit line a bit pair representing a single bit of the information. In the case of that information strip, after manufacture it is possible to write an item of information once, wherein the optical characteristic of the surface portion is irreversibly altered in the operation of writing in one of the two surface portions of the bit pair.

It is known from EP 0 883 085 A1 that each surface portion of a single-line information strip has a plurality of partial surfaces which are occupied alternately with one of two different optical diffraction elements from an amount of n diffraction elements. The diffraction elements of a sub-amount involve the same grating parameters (spatial frequency, profile shape, azimuth etc) and differ from the diffraction elements of the other sub-amounts. Each surface portion differs from its two neighbors by the selection of the diffraction elements for the partial surfaces. The information of those information strips is established by manufacture and cannot be altered individually for each information strip.

WO 00/62237 A2 discloses an information strip with raster elements which are arranged in two lines and which are of equal size, wherein the one diffraction structure of the one line differs from the other diffraction structure of the other line and the grating grooves of the fine relief structures of the diffraction structures are oriented substantially parallel to the lines. A respective raster element from the one line represents a single bit of the information, with the adjacent raster element from the other line. With that information strip, after manufacture, an item of information can be written once, in which case the optical characteristic of the raster element is irreversibly altered in the operation of writing in one of the two raster elements of a bit.

A reading device must simultaneously read out the diffraction structures in both lines of the information strip, in which respect the reading field is to be oriented as exactly as possible with respect to the separation line between the two diffraction structures. The tolerance which can be accepted is not more than ±0.5 mm. Inlays in plastic cards or the like however have a typical tolerance of ±1 mm in relation to the edges.

SUMMARY OF THE INVENTION

Now the object of the invention is to provide a machine-readable individualisable security element which is insensitive in relation to tolerances and which affords a high security standard, and methods of manufacturing the security element and reading out the information stored in the security element.

The object of the invention is attained by a multi-layer body comprising an optically machine-readable identification, wherein the multi-layer body has at least one first plastic material layer with a microscopically fine relief structure shaped in that layer and the optical effect of the microscopically fine relief structure can be altered region-wise for writing in an item of information, wherein it is provided that the multi-layer body has a plurality of first and second regions, wherein in the first regions a microscopically fine first relief structure and in the second regions a microscopically fine second relief structure which is different from the first relief structure and which has a different optically machine-detectable effect are shaped in the first plastic layer, the first and second regions are arranged in the region of the optically machine-readable identification in the form of a background pattern encoding a first item of information, and in the region of the optically machine-readable identification the optical effect of the microscopically fine relief structures is altered in third regions which at least partially cover over first and/or second regions for writing in an individualized code pattern which encodes an individualized second item of information and which overlaps the background pattern.

The object is further attained by a method of manufacturing a multi-layer body comprising an optically machine-readable identification, wherein the multi-layer body has at least one first plastic material layer with microscopically fine relief structures shaped in said layer and the optical effect of the microscopically fine relief structures can be altered region-wise for writing in an item of information, wherein it is provided that an optically machine-readable identification in the form of a background pattern encoding a first item of information is introduced into the multi-layer body, wherein a plurality of first regions with a microscopically fine first relief structure and a plurality of second regions with a microscopically fine second relief structure which is different therefrom and which has a different optically machine-detectable effect is shaped into the multi-layer body, wherein the first and second relief structures are provided with an optically effective reflection layer or an optical separation layer; and in the region of the optically machine-readable identification the optical effect of the microscopically fine relief structures is altered in third regions at least partially covering over first and/or second regions for writing in a code pattern which encodes an individualized second item of information and which overlaps the background pattern.

The object is further attained by a method of reading out a first and a second item of information from a multi-layer body comprising an optically machine-readable identification which has a plurality of first and second regions, wherein the second regions have a different machine-detectable optical effect from the first regions and the first and second regions are arranged in the region of the optically machine-readable identification in the form of a background pattern encoding a first item of information selected from a pattern amount, wherein the elements of the pattern amount have the same code structure and wherein in the region of the optically machine-readable identification third regions at least partially covering over first and/or second regions form an individualized code pattern which encodes an individualized second item of information and which overlaps the background pattern and whose optical effect is different from the optical effect of the first and second regions, wherein it is provided that with an optoelectronic reading device a first electronic image of the first relief structure is produced, from which a first signal pattern is generated, and a second electronic image is produced of the second relief structure, from which a second signal pattern is generated; the first and second signal patterns are integrated portion-wise in accordance with the code structure of the pattern amount; the first item of information is determined from the integrated signal patterns; and the individualized second item of information is determined by addition in respect of amount of the first and second signal patterns.

The multi-layer body according to the invention is distinguished by its insensitivity in relation to positional intolerances upon being applied to a carrier substrate such as for example an identity card and a high level of safeguard against counterfeiting and/or manipulation of the stored information. The multi-layer body has an optically readable background pattern encoding the first information which for example can form a security feature and/or a feature in respect of origin and/or a classification feature. The individualized second item of information is arranged on the background pattern, the second information being represented by regions in which the background pattern is altered. That makes counterfeiting of the individualized code pattern very difficult because the background pattern also has to be counterfeited at the same time and in addition the arrangement of the individualized code pattern on the background pattern has to be counterfeited.

The background pattern can be introduced in manufacture of the multi-layer body. It is of such a nature that it does not give rise to any additional manufacturing complication and expenditure and in addition does not require any additional items of equipment. The microscopically fine relief structures can be introduced into the multi-layer body in accurate register relationship by known methods such as hot embossing or by shaping in UV-hardenable lacquer. These are inexpensive manufacturing methods if large numbers of items are produced, which is possible due to separation at the manufacturing side of production of the background pattern and production of the individualized code pattern. That therefore affords a potentially high level of security and a code which can be very inexpensively individualized. That is in contrast to known high-security systems which typically are highly expensive and difficult for mass production. The multi-layer body can also be a film body in which further security features and/or decorative elements are shaped, which in that way are in register relationship with the above-mentioned relief structures.

The optical effect of the microscopically fine relief structure can be altered by an alteration to the relief structure itself (for example by laser ablation) or by an alteration to the layers optically co-operating with the relief structure, as described more fully hereinafter, or the layer having the relief structure (for example by a thermochromic dye in the embossing layer) or the subjacent layers are altered (for example adapted to the refractive index), that is to say covering the surface with a transparent plastic material prior to application of a metallic or dielectric layer so that the grating is so-to-speak extinguished.

The proposed method of reading out the items of information stored in the multi-layer body according to the invention easily permits parallel output of the first and second items of information, insofar as it is proposed that the first item of information is mathematically reconstructed from the second item of information and for that purpose additional items of information are obtained from the mathematical amount of the items of background information provided. It can therefore be provided for example that the mathematical amount of the items of background information does not include all mathematically possible combinations. Such an item of additional information represents a further security level which cannot be overcome by merely imitating the multi-layer body manufacturing principle.

Further advantageous configurations are set forth in the appending claims.

It can be provided that the relief structures in the first and second regions are formed with an optically effective reflection layer or an optical separation layer. The optically effective reflection layer can be a reflecting layer or a reflecting layer system which can be made from metal, semiconductor or dielectric. It is also possible to provide liquid crystal layers, in particular cholesteric liquid crystal layers. It is also possible to provide pigmented lacquer layers or lacquer layers having organic dyes. The reflection may also involve total reflection which is to be observed at the interface between two layers involving different optical refractive indices, or the layering systems are only visible through (polarization) filters.

It can further be provided that the optically effective reflection layer or the optical separation layer is covered by a protective layer which has a thermochromic dye. The thermochromic dye can permanently alter its color due to a thermal effect, wherein the color change can involve a change in the transparency of the protective layer.

It can advantageously be provided that in a region which represents a bit of the individualized code pattern of the value '1' the reflection layer or the optical separation layer is removed or optically altered or is covered by an opaque layer or the relief structure is altered. It can also be provided that the layer is altered under the relief structure, for example by application of a layer adapted in refractive index prior to application of the metallic or dielectric layer or by an alteration to the adhesive layer.

Alternatively it can be provided that in a region which represents a bit of the individualized code pattern of the value '0' the reflection layer or the optical separation layer is removed or altered or is covered by an opaque layer or the relief structure is altered. In that way the multi-layer body can be particularly well adapted to the conditions of use or the purpose of use. In the case of codes which have a plurality of successive identical bits, the background pattern can also be recognized by a naked eye. Because the background pattern can now be recognizable either in '0' regions or in '1' regions the individualized code pattern can always be such that the background pattern can be readily recognized.

Introduction of the individualized code pattern can be provided at various locations. Serial numbers can be applied for example at the manufacturer or at a central location, for example at a central passport issuing location. The individualized code pattern can however also be applied at decentral issuing locations, for example embassies. The individualized code pattern can also be a composite code pattern which for example includes a production number which is applied in manufacture, a country code or a year code which is applied at the central passport issuing location and a passport number which is applied at the decentral issuing location. In that respect the impression can be given that the individualized code pattern was applied in one working step.

It can further be provided that associated with a first and/or second region of the background pattern encoding a first item of information there is a plurality of third regions of the individualized code pattern encoding an individualized second item of information. That measure also contributes to the background pattern being recognizable and able to be evaluated even after application of the individualized code pattern.

It is also possible for the data to be represented by more than two conditions. The degree of reflection or the degree of transmission of a layer can for example represent five values (0%, 25%, 50%, 75% and 100%) and/or the polarization of diffracted light can involve one of four different directions (0°, 33°, 66.6° and 90°) and/or the relative strengths of the various spectral regions of the diffracted light, measured for example with a color-sensitive CCD sensor, can represent an item of information. That permits a higher level of information density for, instead of the two binary values 0 and 1, it is thus possible for example to represent hexadecimal values.

Further advantageous configurations are directed to the nature of the individualized code pattern.

It can be provided that the individualized code pattern is a one-dimensional bar code. Bar codes are wide-spread in particular for identifying articles. They produce the impression on the part of the viewing person that the code is stored in a sequence of bars of differing widths.

It can further be provided that the individualized code pattern is a two-dimensional bar code. The two-dimensional bar code is also a frequently used code.

Because the individualized code patterns are known code patterns, the background code is firstly perceived as an optical creative design means and is thus withdrawn from broad public awareness and perception.

Further advantageous embodiments are directed to the configuration of the relief structures.

It can be provided that the first and second relief structures are asymmetrical relief structures. The asymmetrical relief structures involve periodic structures having two flanks of differing steepness or gradient. Incident light is therefore preferably deflected in one direction. If the period length of the relief structure is of the order of magnitude of the wavelength or the mean wavelength, the light is diffracted at the relief structure. This can involve for example a blaze grating which is characterized by the grating line spacing and the blaze angle at which the grating elements are inclined. Blaze gratings deflect as much light as possible into a given diffraction order and therefore generate particularly bright diffraction images.

It can be provided that the first and second relief structures have a different k-vector.

It can advantageously be provided that the direction of the k-vector of the first relief structure differs from the direction of the k-vector of the second relief structure by 180°. In that respect it can be provided that the magnitude of the k-vector is identical, that is to say this involves two identical relief structures which are rotated through 180° relative to each other.

It can also be provided that the first and second relief structures have a different grating period.

It can further be provided that the first and second relief structures have a different grating form. Advantageously this can involve relief structures which are combined with an anisotropic matt structure. By way of example the first relief structure can be the matt structure which is combined with a polarization grating for 0° and the second relief structure can be the matt structure which is combined with a polarization grating for 90°.

It can also be provided that the first and second relief structures have a different grating depth.

With the above-described configurations, the first and second relief structures can be so designed that they produce markedly distinguishable optical effects, in particular in relation to inclined incident light. This can involve both changes in the brightness or intensity of the light deflected by the relief structure, and also color effects if the relief structure is illuminated with polychromatic light, for example with daylight.

It can further be provided that the first and second relief structures have a different polarization effect caused by scatter and/or reflection. Polarized light can be influenced and/or identified by means of arrangements of one or more polarization filters. It can therefore be provided that light polarized by the one relief structure passes unimpeded through the arrangement and light polarized by the other relief structure is attenuated. It can also be provided that the relief structures are illuminated with polarized light and in that case for example rotate the polarization plane. The above-described arrangement comprising one or more polarization filters can be provided for evaluation purposes.

A further advantageous configuration provides that the first and second relief structures are in the form of a hologram or a KINEGRAM®. That embodiment can be preferred in order to embed the individualized code pattern in a jewelry element or to make the background pattern particularly forgery-resistant. It can further be advantageous for each portion of the hologram or KINEGRAM® to reproduce almost all the information.

It can also be provided that the first and second regions form a graphic pattern or are part of a graphic pattern.

Further configurations are directed to the method of writing the individualized code pattern in the multi-layer body.

It can be provided that the individualized code pattern is formed by a thermal effect, wherein the reflection layer or the optical separation layer is removed or is altered in respect of its optical effect or the relief structure is altered or a thermochromic dye of the protective layer is activated.

It can also be provided that what is referred to as a PCI (polycarbonate insert) is provided with an individualized code pattern. In particular the KINEGRAM® far the PCI variant can be of a very filigree nature, at least in the regions which are individualized, for example with a photograph or with data such as name and expiry date. In those regions— only between 10% and 50% of the KINEGRAM® are optically active (that is to say they have a grating)—and in those active regions and only in those active regions there is a metallic layer for the diffractive structures. Consequently the KINEGRAM® is completely translucent (that is to say the KINEGRAM® is completely invisible) in between 50% and 90% of the card area, and in that region a laser can easily personalize the photograph and the data. It can consequently be provided that personalization takes place under the KINEGRAM® and its film system (including the adhesive layer). It is possible to provide the following structure:

laser
   air
   protective layers on the PCI card
   KINEGRAM® with metal in between 10 and 50% of the surface area, for example in the form of a thin line or dot pattern
   adhesive layer
   personalization layer which can be blackened by the laser.

In other embodiments it can be provided that the individualized code pattern is formed by printing on an opaque layer.

It can also be provided that the individualized code pattern is formed by the reflection layer being removed by thermal action or altered in its optical effect or the relief structure being altered or a thermochromic dye of the protective layer activated or the transparent protective layer being converted into an opaque protective layer, in the regions of the optically machine-readable identification, that are not associated with the individualized code pattern. The transparent protective layer can be for example a laser-sensitive polycarbonate protective layer which is arranged over a diffractive layer which is metallized or provided with HRI. To carry out that method step, it is possible to use lasers, wherein permanent alterations in a layer which is covered by one or more layers can be effected by virtue of the choice of the kind of laser and the setting of the laser parameters. The individualized code pattern is therefore well protected from damage and from falsification.

It can be provided that an opaque layer is printed on regions of the optically machine-readable identification, that are not associated with the individualized code pattern. Such printing can be provided for example for edge regions of the multi-layer body. It is also possible to apply by printing markings to which a reading device can be aligned.

It can further be provided that the individualized code pattern provides an item of information formed from an individualized item of information and a check code calculated from the individualized item of information. The check code can serve on the one hand to recognize reading errors and optionally correct same. It can however also be provided to detect subsequent changes to the individualized code pattern.

It can further be provided that the individualized code pattern is provided with a start and/or stop portion. The start and/or stop portion can be of the same configuration for all individualized code patterns in order for example to provide correction data for a reading device. It can also be provided that a delimitation sequence for synchronization purposes is introduced into the code pattern.

A further advantageous configuration provides that the first item of information is used for characterization of a security document.

It can be provided that the first item of information includes the nature and/or the purpose of use and/or the origin of the security document.

Further configurations are directed to the method of reading out the items of information.

It can be provided that the multi-layer body is illuminated by a light source and the first and second signal patterns are determined with two sensor lines or sensor arrays arranged on both sides of the multi-layer body. This can involve for example a light source which is arranged centrally over the multi-layer body and the beams of which are so deflected by the relief structures of the multi-layer body that it is deflected in a direction on to the sensor lines or sensor arrays arranged on both sides of the multi-layer body. It can preferably be provided that more than one sensor pixel is associated with each portion of the multi-layer body which embodies one bit. In that way for example a reliable sensor signal can be produced by averaging. It is possible for example to provide 8 sensor pixels per bit.

Alternatively it can be provided that the multi-layer body is illuminated by two light sources arranged on both sides of the multi-layer body and the first and second signal patterns are determined with a sensor line or a sensor array arranged above the multi-layer body, wherein the two light sources are alternately set in operation. In an advantageous configuration it can be provided that the one light source emits red light and the other light source emits blue light, wherein the first signal pattern diffracts for example into the −1st order and the second signal pattern into the +1st order and both light sources simultaneously illuminate the two signal patterns. A single measurement gives both the +1-information and also the −1-information. The −1-information is contained in the red channel of the image while the +1-information is contained in the blue channel. Consequently an image (for example JPEG) contains the −1-information and the +1-information simultaneously. It is also possible to measure two polarization states with one image (red can contain the S-polarization information while blue can contain the P-polarization information).

BRIEF DESCRIPTION OF THE DRAWINGS

The invention is described by way of example hereinafter by means of a number of embodiments with reference to the accompanying drawings in which:

FIG. 3*a* shows an unwritten information track of a first embodiment of a security element according to the invention, FIG. 3*b* shows diagrams illustrating the output signals produced by the reading device in FIG. 2 in respect of the information track in FIG. 3*a*, FIG. 4*a* shows an individualized information track in FIG. 3*a*, FIG. 4*b* shows diagrams illustrating the output signals produced by the reading device in FIG. 2 in respect of the individualized information track in FIG. 4*a*.

DETAILED DESCRIPTION OF THE INVENTION

Figure 1A:
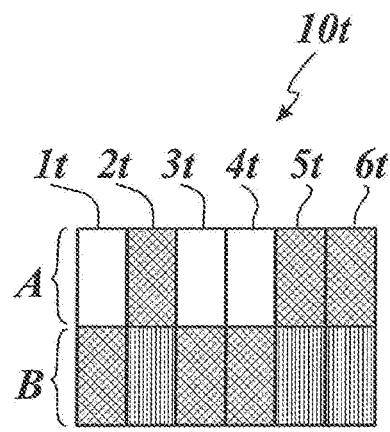
FIG. 1*a* shows an information track of a security element in strip form in accordance with the state of the art.

FIG. 1*a* shows an information track 10*t* of a security element according to the state of the art. As can be seen from FIG. 1*a* the information track 11*t* is subdivided into bit portions 1*t* through 6*t* which are of uniform size and which each represent 1 bit of a binary code. Each bit portion 1*t* through 6*t* is further subdivided into two adjacent regions A and B of equal size, which form two adjacent rows in the direction in which the information track 10*t* extends. The surfaces of the regions A and B are formed with different asymmetrical relief structures. These involve non-holographic asymmetrical diffractive relief structures A and B which deflect incident light into a specific order which is different from zero and which differ from each other in their k-vector. The direction of the k-vector of the relief structure A can be for example 0° and the direction of the k-vector of the relief structure B can be for example 180°. The magnitude of the two k-vectors can be the same. In that respect the relief structure A can represent the binary value '0' and the relief structure B can represent the binary value '1'. The relief structures A and B are provided with a reflection layer, for example with a metallic layer.

For writing an item of information into the information track 10t either the relief structure A or the relief structure B of the bit portions 1t through 6t is removed, for example by laser ablation, or is covered with a layer which is non-reflective or poorly reflective, for example by applying a color layer by printing. In the case where the security element is in the form of an inlay the information can also be written by blackening selected regions of a transparent cover layer, for example with a laser. Therefore, to write a '0' into a bit portion the relief structure B of the bit portion is removed or covered over. The operation of writing in the information is typically effected after application of the OVD to a substrate. More specifically laser ablation can vaporize the metal, leaving behind a transparent region, vaporize the metal and the film system, or vaporize the metal and the film system and deform the substrate—similarly to the situation with the Swiss ID card, or vaporize the OVD, the film system and the substrate—similarly to the situation with what is referred to as the NPLC project in which a hole is simultaneously produced in the KINEGRAM® and the paper substrate.

Figure 2:
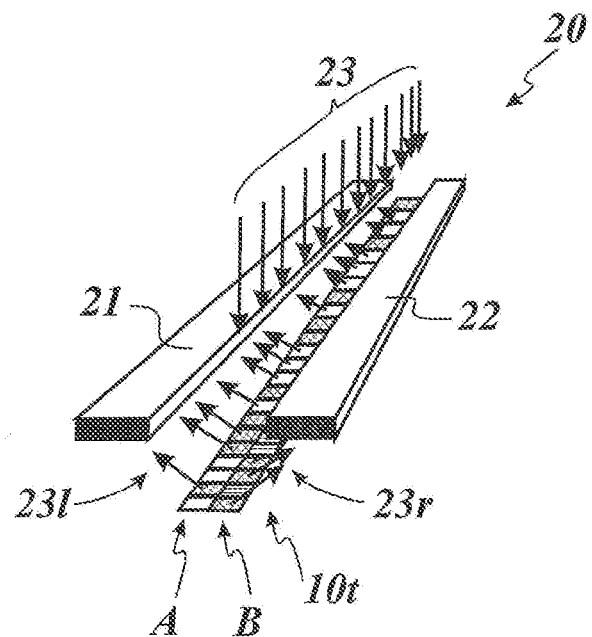
FIG. 2 shows a view illustrating the principle of a reading device.

A reading device 20 as shown in FIG. 2 can be provided for reading out the information stored in the information track. The reading device 20 has detector arrays 21, 22 which are arranged in mutually spaced relationship over the information track 10t of the security element. The length of the detector arrays 21, 22 is determined by the length of the information track 10t. The detector array can be for example a CCD line sensor. The information track 10t is illuminated by beams 23 from a light source arranged over the information track.

The beams 23 are deflected by diffraction at the regions A, B of the information track 10t in such a way that they are incident on the detector array adjacent to the region. In the example shown in FIG. 2 the regions A are adjacent to the detector array 21 and the regions B are adjacent to the detector array 22. The two detector arrays 21, 22 simultaneously detect the light deflected on to them, in which respect it is necessary to provide that the separation line between the regions A and B of the information track 10t coincides with the center line of the measurement field of the two detector arrays 21, 22. The acceptable tolerance of the overlap is ±0.5 mm. That close tolerance which results from the fact that if necessary it is possible to interchange the light source and the detector array is frequently not to be observed in practical use. Plastic cards have for example a tolerance of ±1 mm, in which respect inclined positions of the information track are also possible.

Figure 1B:
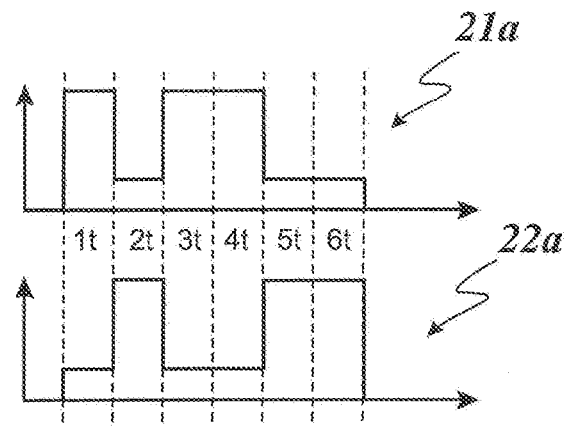
FIG. 1*b* shows diagrams illustrating the output signals produced by a reading device on the basis of the information track in FIG. 1*a*.

FIG. 1b shows diagrams illustrating the output signals 21a and 22a of the detector arrays 21 and 22 for an ideal reading operation, that is to say for a tolerance-free position of the information track 10t relative to the two detector arrays. The abscissa of the diagram denotes the association of the output signal with the bit portion and the ordinate denotes the signal level of the bit portion. This diagrammatic view does not take account of the fact that n individual sensors can be provided per bit portion on the detector array, of which each in itself can form an individual output signal which varies about the ideal value within a tolerance range.

FIGS. 3a and 4a now show a first embodiment of a security element according to the invention with an information track 10. The information track 10 is provided during manufacture with a binary code which involves bit portions 1 through 7 in strip form, the surface of which can have either a relief structure of type A or a relief structure of type B, as described hereinbefore. In the FIG. 3 example the information track 10 has seven bit portions which in accordance with the above-described association represent the binary code '0011010'. The binary code can be provided for storage of the purpose of use and/or operation of the security document provided with the security element. By way of example the information track can have the code '01011100' for a passport or an ID card used in France and the code '10100001' for a passport or an ID card used in Germany.

FIG. 3b, similarly to FIG. 1b, shows diagrams illustrating the output signals 321a and 322a of the reading device 20 shown in FIG. 2. Because the bit portions 1 through 7 arranged in succession in the direction in which the information track 10 extends have either the relief structure A or the relief structure B the output signal is in principle like the output signal shown in FIG. 1. In spite of that conformity in principle however the error tolerance is markedly greater for the information track is not formed with a center line like the information track in FIG. 1a in accordance with the state of the art. The output signal 322a of the detector array 22 can be represented by negation of the output signal 321a of the detector array 21 and vice-versa. Reading errors can therefore be detected and corrected by a simple checking calculation.

The information track 10 can be individualized prior to delivery of the security document. FIG. 4a shows an individualized information track 10i in which the bit portions 1i through 3i have been produced by removal of or covering over the reflection layer on the bit portions 1 through 7.

As can be seen from FIG. 4b the output signals 421a and 422a of the detector arrays 21 and 22 are also error-tolerant to a high level. The individualized information, represented by the bit portions 1i through 3i, lowers the output signal to the same extent in both detector arrays. In the FIG. 4b embodiment the output signal of the bit portions 1i through 3i is equal to zero, the low value of the output signal of the bit portions 1 through 7 is different from zero and is lower than the high value of the output signal of the bit portions 1 through 7. It is provided that the low value of the output signal is also greater than the output signal of the bit portions 1i through 3i even if it is different from zero. In that way measurement errors which can occur for example due to positional deviations of the detector arrays 21, 22 or due to soiling of or damage to the information strip 10i can be eliminated. It can also be provided that optical elements such as for example cylindrical lenses are arranged in front of the detector arrays 21, 22 to concentrate the light reflected by the information strip 10i on to the detector arrays 21, 22.

The asymmetry of the blaze gratings which form the information track 10i, produced by hot embossing, involves a ratio of 5:1 through 20:1. With those values the individualized information code can be very easily separated from the background code. For high values of asymmetry, which for example can be implemented with asymmetrical achromatic gratings or highly polarized codes, it is more difficult to separate the individualized information code from the background code. In that case it can advantageously be provided that the sum and the difference of the two codes (−1-code and +1-code) are determined and the individualized item of information is calculated from those two measurements.

The width of the information strip 10i is determined by the measurement field of the detector arrays 21, 22 and the maximum positional tolerance for which the information strip is designed. The width of the information strip should be of the order of magnitude of the width of the measurement field or smaller and/or it should be greater than the maximum positional tolerance. The positional tolerance which, upon application of security elements to security documents in the form of plastic cards, is generally ±1 mm, leads to no adverse effect when reading the information out of the information strip 10*i*. As already described hereinbefore, that is to be attributed to the fact that the measurement zone of the detector array can be anywhere within the information strip. In the case of an information strip according to the state of the art the measurement field must be disposed along or close to the center line of the two regions with the relief structures A and B.

Figure 5A:
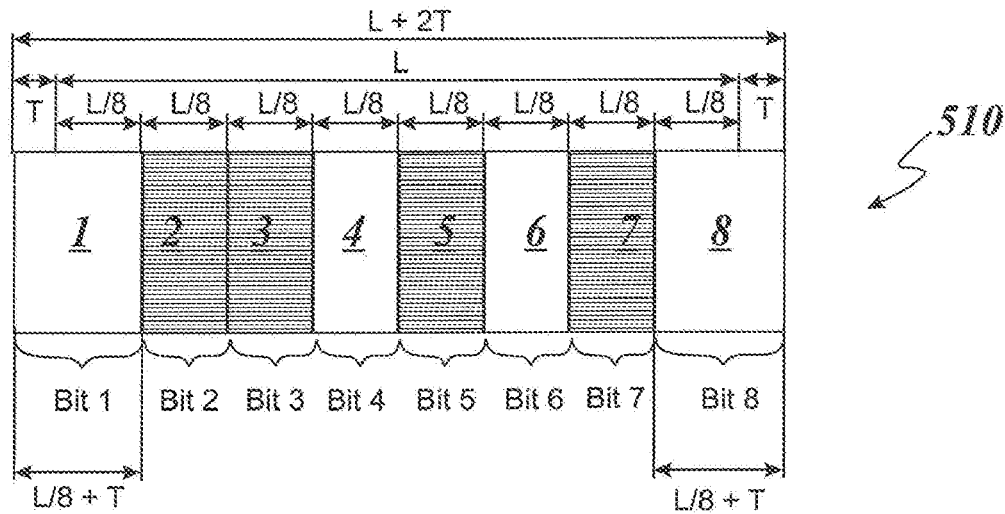
FIG. 5*a* shows an unwritten information track of a second embodiment of a security element according to the invention.
Figure 5B:
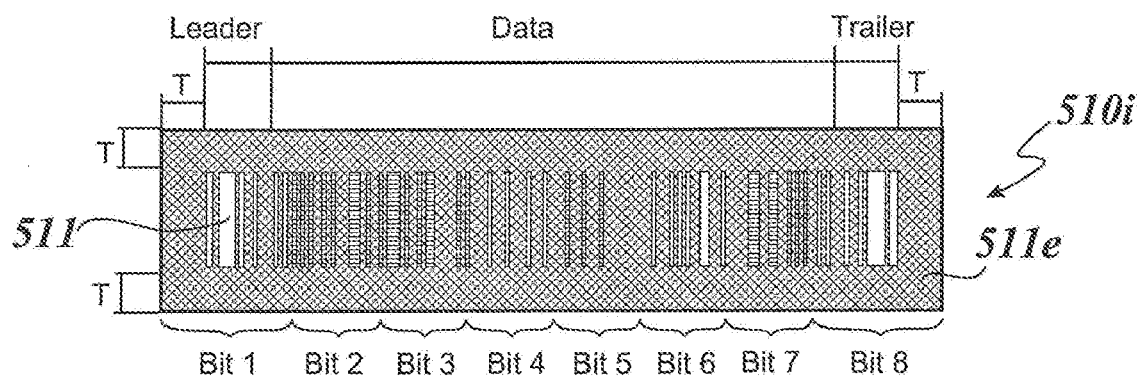
FIG. 5*b* shows an individualized information track in FIG. 5*a*.

FIGS. 5*a* and 5*b* now show a second embodiment of a security element according to the invention.

FIG. 5*a* shows an information track 510 which is introduced into the security element in manufacture. The information track 510 can be integrated into a security element of higher order, for example a KINEGRAM® so that it is visually not striking. The information track 510 is provided during manufacture with a binary code which is bit portions 1 through 8 in strip form, the surface of which can have either a relief structure of type A or a relief structure of type B, as described hereinbefore. The bit portions represent the binary code '01101010' in accordance with the association described hereinbefore. The information track 510 has edge portions of a length T, in the longitudinal direction in which it extends. The length of the inner portion of the information track 510, which is provided for representation of the binary code, is denoted by L. A bit portion 1 through 8 in strip form is therefore of a length L/8. The two edge portions are sub-portions of the outer bit portions 1 and 8 which are therefore of a length (L/8+T).

FIG. 5*b* now shows an individualized information track 510*i* formed from the information track 510 in FIG. 5*a* by the application of a bar code 511. In the embodiment illustrated in FIG. 5*b* the bar code 511 is produced by laser ablation. This is a 160 bit code in which a '1' bit is identified by a region of removed reflection layer. The bar code 511 is surrounded on all sides by an edge strip of the width T, in which the reflection layer is also removed. The regions 511*e* removed by laser radiation are shown backed by cross-hatching in FIG. 5*b*. That configuration is particularly advantageous for enhancing the level of safeguard against subsequent manipulation for then no additional code can be written into the removed regions.

As can be seen from FIG. 5*b* the surfaces of the bars of the bar code 511 which represent a '0' bit have either a relief structure A or a relief structure B, the arrangement of the relief structures A, B corresponding to the arrangement which is produced in manufacture of the information track 510 (FIG. 5*a*).

The bar code 511 is provided with a leader and a trailer so that the data portion on the bar code can be easily identified. The leader and/or the trailer also simplify error correction if it is provided that the leader and the trailer are identical for each individual bar code. It is however also possible to dispense with the leader and the trailer without casting doubt on the function of the information track or the readability of the bar code 511. In regard to the high error tolerance of the information track 510*i* attention is directed to the description relating to FIG. 4*a*.

The information track 510*i* shown in FIG. 5*b* also has a high level of safeguard against forgery because a copy of the bar code 511 alone does not cause the output signal of an unforged bar code.

In the embodiment shown in FIGS. 5*a* and 5*b* the information track 510*i* is 20 mm long and 4 mm wide. The width of the edge portions T is 1 mm. The length L which can be used for the bar code is therefore 18 mm. If 200 bits are provided for the code and 8 bits for each of the leader and the trailer, then there are 18/216 mm=83 µm provided for a bit. On the assumption that a sensor pixel of a reading device is of a width of 8 µm and an imaging scale of 1:1 is selected, a bit is imaged by eight sensor pixels. That implements a good signal spacing.

The information track used as the background track is encoded with 8 bits, that is to say each bit is of a width of 2.25 mm and 27 data bits are allotted to each background bit. It is important for the intended purpose that a plurality of data bits are allotted to a background bit in order to be able to reliably read out the information track 510. In particular portions of the information track 510*i*, in which a plurality of '0' bits follow each other are suitable for the reading-out procedure.

It can however also be provided that the '0' bit is produced by removal of the reflection layer and the '1' bit has either the relief structure A or the relief structure B. In that case, in particular portions of the information track 510*i*, in which a plurality of '1' bits follow each other, are suitable for reading out the information track 510.

Figure 6A:
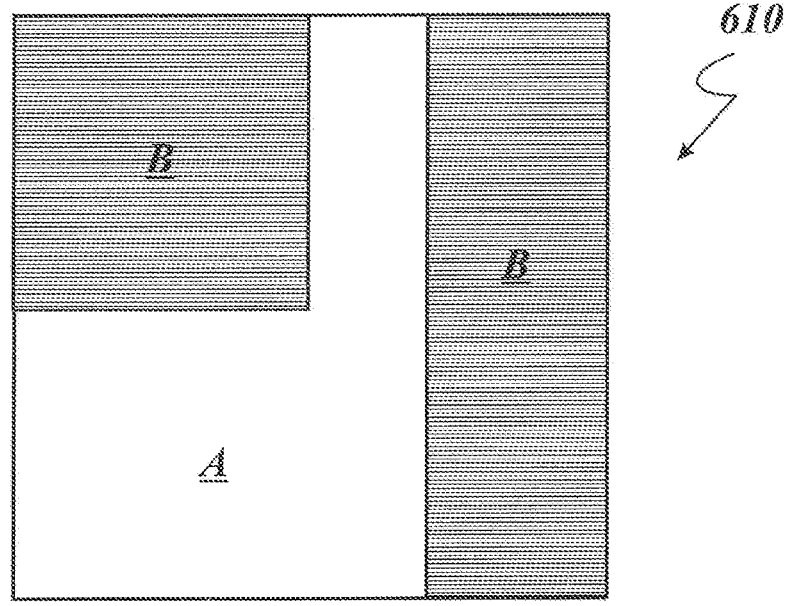
FIG. 6*a* shows an unwritten two-dimensional information track of a third embodiment of a security element according to the invention.
Figure 6B:
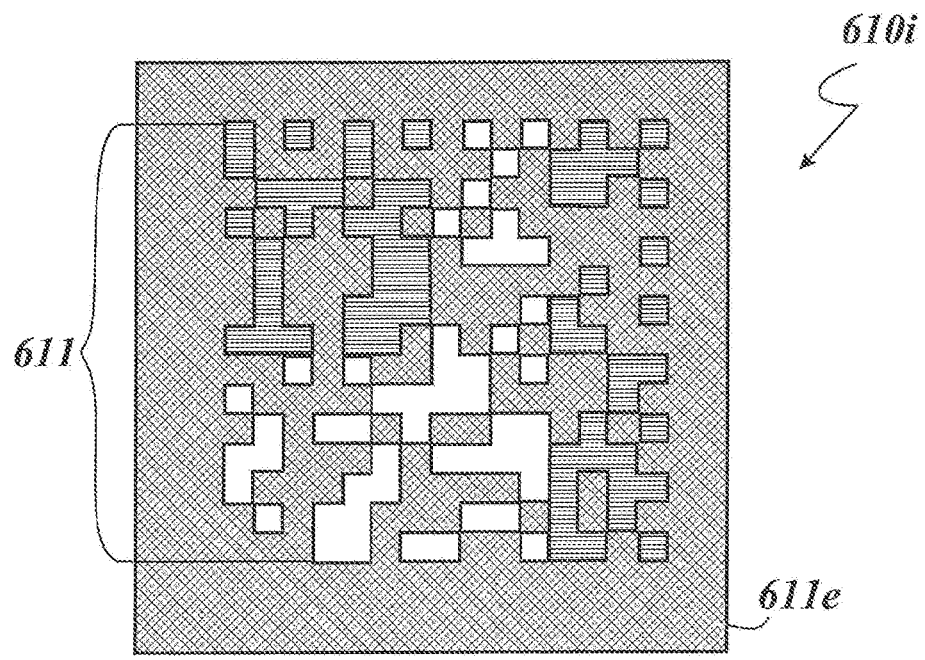
FIG. 6*b* shows an individualized information track in FIG. 6*a*.

FIGS. 6*a* and 6*b* now show a third embodiment of a security element according to the invention with a two-dimensional information field 610, from which an individualized information field 611*i* can be produced by applying a two-dimensional bar code 611.

The information field 610 shown in FIG. 6*a* has a simple geometrical pattern which is formed from regions with the relief structure A and regions with the relief structure B and serves as a background pattern for the bar code 610*i*. The background pattern can be varied within wide limits insofar as it is ensured that it is identifiable by means of a computer-aided image acquisition program. It can therefore also be a complex visually recognizable pattern as in the embodiment illustrated hereinafter in FIGS. 9*a* and 9*b*, which shows a stylized profile of the literary figure Sherlock Holmes. Such a background pattern can also be visually at least roughly verified on the basis of its optical impression. Instead of a graphic representation it is also possible for example to provide one or more alphanumeric characters such as for example a country code such as 'CHE' or 'USA' or a logo such as for example a key or the Swiss Cross.

FIG. 6*b* now shows the individualized information field 610*i*, to which the two-dimensional bar code 611 is applied. The bar code 611 in the FIG. 6*b* embodiment is produced by laser ablation by the reflection layer being removed in the regions of the information track 610, which are not covered by the bar code 611. The bar code 611 is surrounded on all sides by an edge strip. The regions 611*e* removed by laser radiation are shown backed by cross-hatching in FIG. 6*b*. The code shown in FIG. 6*b* is representative of the numerous codes which are defined in international standards such as for example Data Matrix ECC200, PDF417 and Maxi Code.

FIGS. 7*a* through 8*b* now show an operative principle suitable for reading the information out of the information field 610*i* in FIG. 6*b*.

Figure 7A:
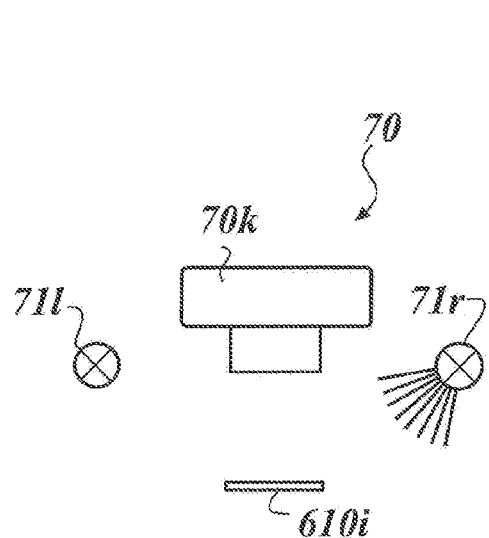
FIG. 7*a* shows a reading device for reading out the information track in FIG. 6*b* with illumination from the right.
Figure 7B:
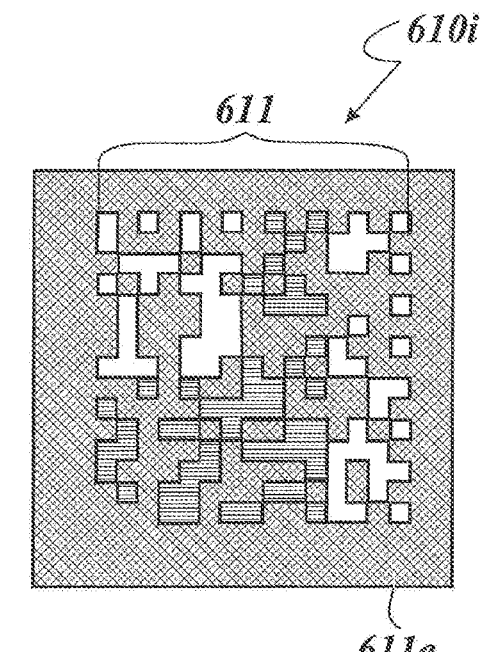
FIG. 7*b* shows a plan view of the information track in FIG. 6*b* illuminated as in FIG. 7*a*.

FIG. 7*a* shows a reading device 70 formed from an electronic camera 70*k* and two light sources 71*l* and 71*r* in strip form. The electronic camera 70*k* has a 2D sensor which for example can be a matrix-form sensor. It is alternatively also possible to provide a sensor in line form or point form which is connected to a suitable deflection system or which is movable in such a way that it can scan any point of a two-dimensional area. The electronic camera 70*k* is arranged over the individualized information field 610*i*.

The light sources 71*l*, 71*r* are connected to a change-over switch (not shown) so that either the light source 71*r* or the light source 71*l* can be switched on. In FIG. 7*a* the light source 71*r* is switched on. The beams from the light source 71*r* impinge at an angle on the surface of the information field 610*i* and are diffracted into the objective of the camera 70*k* by the regions having the relief structure B. They therefore appear as light surfaces in the plan view on to the information field 610*i*. The regions with the relief structure A are substantially lit up only by scatter light and therefore appear as dark regions which stand out only little or not at all from the regions in which the reflection layer is removed by laser ablation.

Figure 8A:
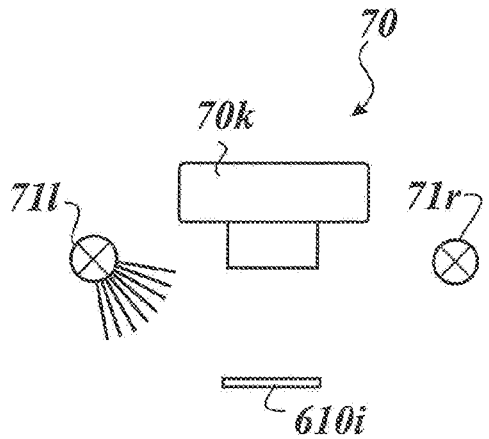
FIG. 8*a* shows the reading device in FIG. 7*a* with illumination from the left.
Figure 8B:
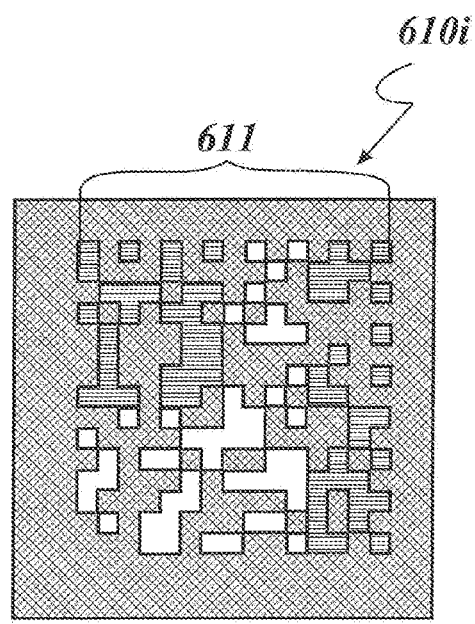
FIG. 8*b* shows a plan view of the information track in FIG. 6*b* illuminated as in FIG. 8*a*.

FIG. 8*a* shows the arrangement of FIG. 7*a*, with the light source 71*l* switched on. The beams from the light source 71*r* impinge at an incline on the surface of the information field 610*i* and are diffracted into the objective of the camera 70*k* by the regions having the relief structure A. Now, as shown in FIG. 8*b*, they appear as light surfaces in the plan view on to the information field 610*i* while the regions with the relief structure B are lit up substantially only by scatter light and therefore appear as dark regions which stand out only little or not at all from the regions in which the reflection layer is removed by laser ablation.

All the information stored in the bar code 611 can be ascertained from the overlap of both partial images of the information field 610*i*, wherein the distribution of the relief structures A and B in the information field 610*i* can serve for authentication of that information. A further advantage of the arrangement described in this embodiment is the high level of insensitivity to tolerances and soiling and/or damage. Troubles can be very easily eliminated in particular if the configuration of the information field 610 used as the background for the bar code 611 is known (see FIG. 6*a*).

The arrangement is further insensitive in relation to ageing or positional tolerances of the light sources 71*l* and 71*r* because the two partial images produced by the camera 70*k* can be electronically standardized to equal brightness, with the incorporation of the information field 610.

Figures 9A, 9B:
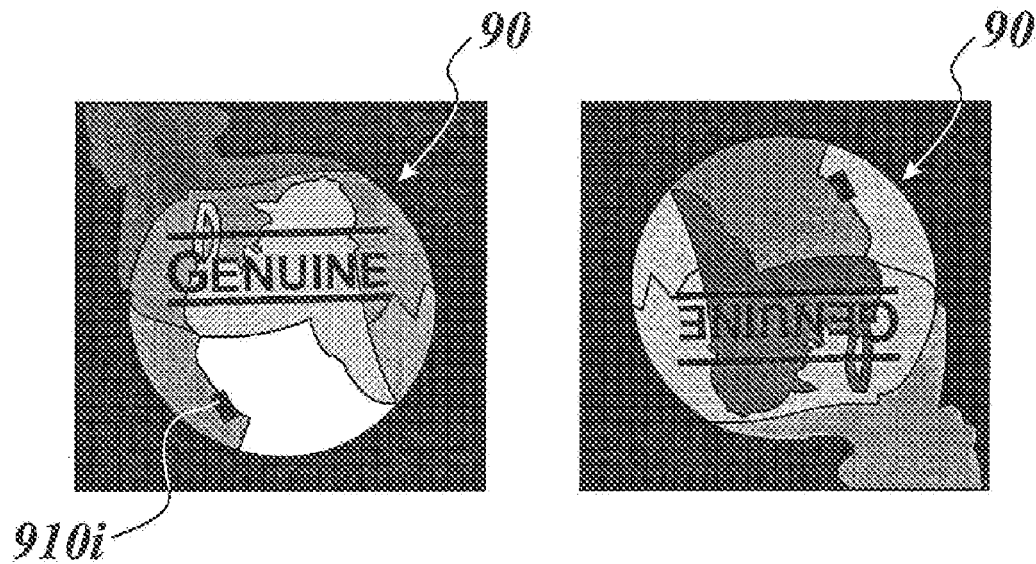
FIG. 9*a* shows a photographic image of a security element according to the invention as a front view.
FIG. 9*b* shows a photographic image of a security element according to the invention as a rear view, and FIGS. 10*a* and *b* show embodiments of holographic background patterns.

FIGS. 9*a* and 9*b* now show photographs FIGS. 9*a* and 9*b* of a security element 90 according to the invention with embedded information track 910*i*, also referred to as a 'diffractive watermark'. The visual design selected here is a hologram or KINEGRAM® showing a stylized profile of the literary figure Sherlock Holmes. FIG. 9*a* shows the security element 90 in an upright position when viewing from the front side while FIG. 9*b* shows it upside down when viewing from the rear side.

The relief structures A and B used in the above-mentioned examples of use can differ from each other in respect of their polarization properties and/or their grating period and/or their grating direction and/or their grating form and/or their grating depth and in that way are detectable for optical reading devices. The relief structures can also be computer-generated holograms. That large number of possible variations additionally causes difficulty in making unauthorized copies or can limit verification to reading devices which are especially designed and/or which are not available to the general public, in which case the operation of reading out the information of the bar code with commercially available reading devices can be possible. The relief structures can also be projected on to a screen and a CCD camera can acquire the screen representation. It is therefore possible to be highly flexible in terms of the design of the reading device.

Figures 10A, 10B:
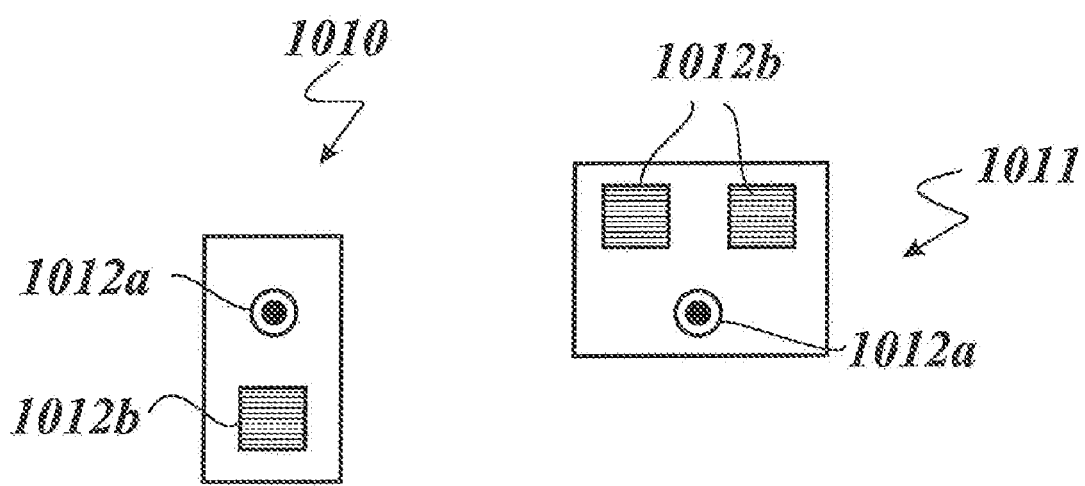

FIGS. 10*a* and 10*b* now show information fields 1010 and 1011 which can be used as the background and which have computer-generated holograms 1012*a* and 1012*b* which optically differ from each other. Because of the property of the holograms that each partial region of the hologram can reproduce the information of the hologram, holograms can contribute to further increasing the tolerance insensitivity. The holograms further contribute to enhancing the level of safeguard against forgery for a hologram can only be imitated at a very high level of complication and expenditure.

The invention claimed is:

1. A multi-layer body comprising an optically machine-readable identification, wherein the multi-layer body has at least one first plastic material layer with a microscopically fine relief structure shaped in that layer and the optical effect of the microscopically fine relief structure can be altered region-wise for writing in an item of information, and
wherein the multi-layer body has a plurality of first and second regions, wherein, in the first regions, a microscopically fine first relief structure and, in the second regions, a microscopically fine second relief structure, which is different from the first relief structure and which has a different optically machine-detectable effect are shaped in the first plastic layer, the first and second regions are arranged in the region of the optically machine-readable identification in the form of a background pattern encoding a first item of information, in the region of the optically machine-readable identification the optical effect of the microscopically fine relief structures is altered in third regions which at least partially cover over first or second regions for writing in an individualized code pattern which encodes an individualized second item of information and which overlaps the background pattern, wherein the individualized code pattern is formed by a reflection layer or an optical separation layer of the multi-layer body being removed by thermal action or altered in its optical effect or the relief structure being altered or a thermochromic dye of a protective layer of the multi-layer body being activated, in the regions of the optically machine-readable identification, that are not associated with the individualized code pattern.

2. A multi-layer body as set forth in claim 1, wherein in a region which represents a bit of the individualized code pattern of the value '1', the reflection layer or the optical separation layer is removed or optically altered or is covered by an opaque layer or the relief structure is altered.

3. A multi-layer body as set forth in claim 1, wherein in a region which represents a bit of the individualized code pattern of the value '0', the reflection layer or the optical separation layer is removed or altered or is covered by an opaque layer or the relief structure is altered.

4. A multi-layer body as set forth in claim 1, wherein associated with a first or second region of the background pattern encoding a first item of information there is a plurality of third regions of the individualized code pattern encoding an individualized second item of information.

5. A multi-layer body as set forth in claim 1, wherein the individualized code pattern is a one-dimensional bar code.

6. A multi-layer body as set forth in claim 1, wherein the individualized code pattern is a two-dimensional bar code.

7. A multi-layer body as set forth in claim 1, wherein the first and second relief structures are asymmetrical relief structures.

8. A multi-layer body as set forth in claim 7, wherein the first and second relief structures have a different k-vector.

9. A multi-layer body as set forth in claim 8, wherein the direction of the k-vector of the first relief structure differs from the direction of the k-vector of the second relief structure by 180°.

10. A multi-layer body as set forth in claim 7, wherein the first and second relief structures have a different grating period.

11. A multi-layer body as set forth in claim 7, wherein the first and second relief structures have a different grating form.

12. A multi-layer body as set forth in claim 7, wherein the first and second relief structures have a different grating depth.

13. A multi-layer body as set forth in claim 7, wherein the first and second relief structures have a different polarization effect caused by scatter or reflection.

14. A multi-layer body as set forth in claim 7, wherein the polarization effect of the first and second relief structures are caused by scatter and reflection.

15. A multi-layer body as set forth in claim 1, wherein the first and second relief structures are in the form of a hologram or an optically variable device (OVD) with two-dimensional motion or part of a hologram or an optically variable device (OVD) with two-dimensional motion.

16. A multi-layer body as set forth in claim 1, wherein the first and second regions form a graphic pattern or are part of a graphic pattern.

17. A multi-layer body as set forth in claim 1, wherein the third regions at least partially cover over the first and second regions.

18. A multi-layer body as set forth in claim 1, wherein the plurality of third regions of the individualized code pattern encoding the individualized second item of information is associated with the first and the second region of the background pattern encoding the first item of information.

19. A method of manufacturing a multi-layer body comprising an optically machine-readable identification, wherein the multi-layer body has at least one first plastic material layer with microscopically fine relief structures shaped in said layer and the optical effect of the microscopically fine relief structures can be altered region-wise for writing in an item of information, and wherein an optically machine-readable identification in the form of a background pattern encoding a first item of information is introduced into the multi-layer body, wherein a plurality of first regions with a microscopically fine first relief structure and a plurality of second regions with a microscopically fine second relief structure which is different therefrom and which has a different optically machine-detectable effect is shaped into the multi-layer body, wherein the first and second relief structures are provided with an optically effective reflection layer or an optical separation layer; in the region of the optically machine-readable identification the optical effect of the microscopically fine relief structures is altered in third regions at least partially covering over first or second regions for writing in a code pattern which encodes an individualized second item of information and which overlaps the background pattern; and the individualized code pattern is formed by the reflection layer or the optical separation layer being removed by thermal action or altered in its optical effect or the relief structure is altered or a thermochromic dye of a protective layer is activated, in the regions of the optically machine-readable identification, that are not associated with the individualized code pattern.

20. A method as set forth in claim 19, wherein the individualized code pattern is formed by a thermal effect, and wherein the reflection layer or the optical separation layer is removed or is altered in respect of its optical effect or the relief structure is altered or a thermochromic dye of the protective layer is activated or a transparent protective layer is converted into an opaque protective layer.

21. A method as set forth in claim 19, wherein the individualized code pattern is formed by printing on an opaque layer.

22. A method as set forth in claim 19, wherein an opaque layer is printed on regions of the optically machine-readable identification, that are not associated with the individualized code pattern.

23. A method as set forth in claim 19, wherein the individualized code pattern provides an item of information formed from an individualized item of information and a check code calculated from the individualized item of information.

24. A method as set forth in claim 19, wherein the individualized code pattern is provided with a start or stop portion.

25. A method as set forth in claim 19, wherein the first item of information is used for characterization of a security document.

26. A method as set forth in claim 25, wherein the first item of information includes the nature or the purpose of use or the origin of the security document.

27. A method as set forth in claim 25, wherein the first item of information includes the nature and the purpose of use and the origin of the security document.

28. A method as set forth in claim 19, wherein the third regions at least partially cover over the first and second regions.

29. A method as set forth in claim 19, wherein the individualized code pattern is provided with a start and a stop portion.

30. A method of reading out a first and a second item of information from a multi-layer body comprising an optically machine-readable identification which has a plurality of first and second regions, wherein the second regions have a different machine-detectable optical effect from the first regions and the first and second regions are arranged in the region of the optically machine-readable identification in the form of a background pattern encoding a first item of information selected from a pattern amount, wherein the elements of the pattern amount have the same code structure and wherein in the region of the optically machine-readable identification third regions at least partially covering over first or second regions form an individualized code pattern which encodes an individualized second item of information and which overlaps the background pattern and whose optical effect is different from the optical effect of the first and second regions, and wherein with an optoelectronic reading device a first electronic image of the first relief structure is produced, from which a first signal pattern is generated, and a second electronic image is produced of the second relief structure, from which a second signal pattern is generated; the first and second signal patterns are integrated portion-wise in accordance with the code structure of the pattern amount; the first item of information is determined from the integrated signal patterns; and the individualized second item of information is determined by addition in respect of amount of the first and second signal patterns.

31. A method as set forth in claim 30, wherein the multi-layer body is illuminated by a light source and the first and second signal patterns are determined with two sensor lines or sensor arrays arranged on both sides of the multi-layer body.

32. A method as set forth in claim 30, wherein the multi-layer body is illuminated or transilluminated by two light sources arranged on both sides of the multi-layer body and the first and second signal patterns are determined with a sensor line or a sensor array arranged above or under the multi-layer body, and wherein the two light sources are alternately set in operation.

33. A method as set forth in claim 30, wherein the third regions at least partially cover over the first and second regions.

34. A method as set forth in claim 30, wherein the multi-layer body is illuminated and transilluminated by the two light sources, and wherein the sensor line or the sensor array is arranged above and under the multi-layer body.

* * * * *

UNITED STATES PATENT AND TRADEMARK OFFICE
CERTIFICATE OF CORRECTION

PATENT NO. : 8,020,776 B2  Page 1 of 1
APPLICATION NO. : 12/223596
DATED : September 20, 2011
INVENTOR(S) : Tompkin et al.

It is certified that error appears in the above-identified patent and that said Letters Patent is hereby corrected as shown below:

Column 6, line 34, now reads "the KINEGRAM® far the PCI"

should read -- the KINEGRAM® for the PCI --

Signed and Sealed this
Ninth Day of October, 2012

David J. Kappos
*Director of the United States Patent and Trademark Office*